UNITED STATES PATENT OFFICE.

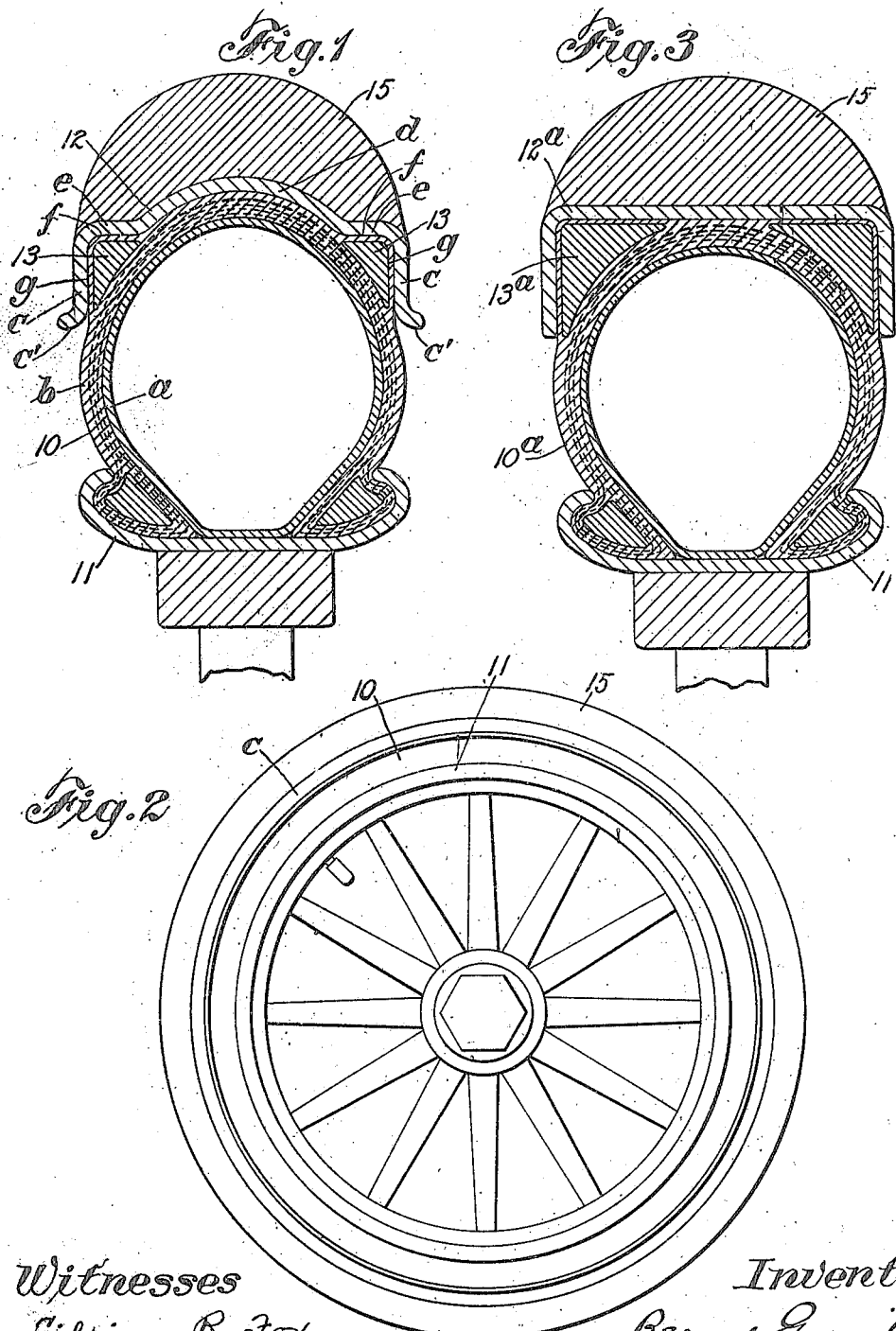

BERNARD GRANVILLE, OF NEW YORK, N. Y.

PNEUMATIC TIRE.

1,213,096.   Specification of Letters Patent.   Patented Jan. 16, 1917.

Application filed December 4, 1915. Serial No. 65,001.

*To all whom it may concern:*

Be it known that I, BERNARD GRANVILLE, a citizen of the United States, residing at New York city, in the county of New York and State of New York, have invented certain new and useful Improvements in Pneumatic Tires, fully described and represented in the following specification and the accompanying drawings, forming a part of the same.

This invention relates to pneumatic tires for vehicle wheels, and especially for wheels of automobiles or motor vehicles.

More particularly the invention relates to pneumatic tires of that class known as armored tires, in which the tread of the annular air-containing body of more or less flexible material is protected against puncture by means of a puncture resisting band or rim of metal.

The object of the invention is to provide a tire of this class which shall retain the riding qualities of the ordinary unarmored pneumatic tire, shall be of simple and comparatively inexpensive construction, and shall require no change in structure of the felly and tire attaching rim of the wheel and may be made for attachment to the various styles of rims commonly in use, and which shall possess other important advantages some of which are hereinafter referred to.

Many efforts have been made heretofore to produce a practical and satisfactory pneumatic tire in which the annular air-containing body is protected against puncture and wear by means of a metal band or plate, but such structures, so far as I am aware, have been unsatisfactory, if not wholly worthless, either because of their not having the desired riding qualities or because of their not being durable under the severe strains to which they are necessarily subjected in use. Such prior structures of which I have knowledge have also been of relatively complicated and expensive construction.

In a tire made in accordance with my present invention, I provide a rigid outer rim consisting of a single integral piece of suitable metal and of a weight and shape to give the desired degree of strength and rigidity, and a strong flexible annular tubular inflatable body of rubber and canvas or other suitable material to the peripheral or tread portion of which the outer rigid rim is applied and by which it is supported, and I form the outer rigid rim and the peripheral portion of the air-containing body with oppositely engaging circumferentially-extending faces whereby the rim is held against lateral displacement relatively to the body. The flexible annular inflatable body may be similar in its general construction to an unarmored pneumatic tire and may be secured to the wheel felly in any usual or suitable manner, but it must be of sufficient strength to resist when inflated the side strains transmitted to it from the rigid outer rim and prevent abnormal lateral displacement of the rim relatively to the wheel felly. The rigid outer rim is provided with a cushion tread which is most desirably of solid rubber.

In the construction which I now consider best and which has proved eminently satisfactory in use, the rigid outer or armor rim is formed with inwardly extending approximately parallel side flanges integral with the intermediate or main portion of the rim which is best made flat or with a circumferentially extending centrally located bulge. The meeting ends of the rim are welded together in such manner as to give the required strength and durability to enable the rim to stand up under long continued use. The annular inflatable body to which such channeled rim is to be applied has its peripheral or tread portion formed with circumferential extensions or ribs so as to fit within the channel of the rim, and the body is made of such circumferential size that when inflated its tread portion will be pressed outward tightly into the channeled rim. The rim will thus be carried and held in position solely by the inflated body, no additional guiding or other means being required to prevent lateral displacement of the rim, and the flexible side walls of the body being entirely unrestrained and free so that the air-containing body may perform its cushioning functions to the full extent necessary for affording the desired riding qualities.

A full understanding of the invention can best be given, and various features and advantages thereof can best be pointed out, in connection with a detailed description of an approved embodiment of the invention, and such a description will now be given in connection with the accompanying drawings which illustrate two forms of tires made in accordance with the invention and which I now consider as the best embodiments thereof.

In said drawings:—Figure 1 is a view in cross-section of a tire made in accordance with the invention and a wheel felly to which it is attached; Fig. 2 is a view in elevation of an automobile wheel provided with a tire such as shown in Fig. 1; and Fig. 3 is a cross-sectional view similar to Fig. 1 but showing a construction differing in some respects from that of Fig. 1.

Referring to the drawings, and first to Figs. 1 and 2, the annular, tubular inflatable body 10 shown is constructed like an ordinary inner tube clencher pneumatic tire, having a thin inner air tube $a$ of flexible rubber, and an outer casing $b$ of rubber and fabric split or open circumferentially at its inner side and having its edges formed in the usual manner to engage the inturned edges of a metal clencher rim 11 of the wheel felly. Applied to the peripheral or outer portion of the body casing $b$, is a continuous outer puncture-resisting rim 12, which is formed with side flanges $c$ extending inwardly approximately parallel to each other and to the plane of the axis of the tire, (such plane being at right angles to the wheel axis or axis of rotation of the tire) and with its intermediate or main portion between the flanges transversely flat adjacent the flanges and with an outward bulge $d$ between the flat parts $e$. The flanges $c$ desirably have outwardly turned edges $c'$ for protecting the sides of the body 10 as hereinafter explained. The peripheral or tread portion of the body casing $b$ is shaped to fit within the channel of the rim 12 between its side flanges, being formed with lateral ribs or ridges 13 which have faces $f$ to bear against the outer flat parts $e$ of the rim and side faces $g$ to bear against the flanges $c$, said faces $g$ being approximately parallel to each other and to the plane of the axis of the casing. The side faces of the ribs 13 and the inner sides or faces of the flanges $c$ thus provide oppositely engaging circumferentially extending faces by which the rim 12 is held against lateral displacement relatively to the body 10. For a rim 12 of the cross-sectional shape shown in Fig. 1, the part of the body casing between the rectangular ribs 13 will be formed to extend into and seat against the circumferential bulge $d$. The rim 12 is provided with a cushion tread 15, most desirably of rubber and of suitable thickness, which should best cover the whole outer surface of the rim and which may be secured thereto by being caused to adhere directly to the surface of the rim or in other suitable manner.

The tire shown in Fig. 3 differs from that of Fig. 1 in that the rigid armor rim $12^a$ is of different shape in cross-section and the tread portion of the casing of the body $10^a$ is correspondingly shaped. The intermediate or main portion of the rim shown in this figure is transversely flat all the way across between the side flanges and the edges of the side flanges are not turned outward, and the ribs $13^a$ of the casing of the inflatable body are extended so that the casing has a square peripheral or tread portion to fit in the channel of the rim. Either form of rim, as well as various other forms which might be used under the invention, is good, but the form shown in Fig. 1 has the practical advantages of giving greater strength and rigidity for the same weight of metal without excessive depth of the side flanges, aiding in holding the tread against side thrust, and saving rubber in both the body and the cushion tread.

As the outer rim 12 is carried and held in position wholly by the inflatable tubular cushioning body 10, the body must be of sufficient strength and suitably secured to the wheel felly to resist the strains transmitted to it through the outer rim. The required strength of the body will of course vary according to its size and the weight of the vehicle to which the tire is to be applied. As a general rule, I find it to be sufficient if the flexible inflatable body of one of my tires for carrying a given load is of somewhat less strength than an ordinary of standard pneumatic tire adapted for carrying the same load, and I have found the usual fabric and rubber construction of the ordinary pneumatic tire well adapted for the inflatable body of my tire. The fabric for giving strength to the body or casing should most desirably extend about the casing in the usual manner substantially parallel with the inner surface thereof as indicated in the drawings; and the ribs 13 may be molded from suitable material, such as a suitable rubber composition, without fabric, but with, most desirably, the outer layer of rubber of the casing extending outside the filling portion of the ribs as indicated in the drawings. The casings shown may be made in the usual manner of producing casings for inner tube clencher tires, the mold being shaped to provide space for and to properly form the ribs 13. In laying up the material for molding, suitable strips of material for forming the filling or body portion of the ribs 13 will be placed in position before the outer layer of rubber is put on, so that the outer layer will then extend over such strips of material to provide in the completed casing after vulcanization a continuous layer extending over the whole outer surface of the casing.

The outer rim 12 must not only be puncture resistant, but it must be of a material and strength to withstand the strains and shocks to which it is subjected and to retain its strength under the strains and shocks of long continued use. So far as I know now, the only material suitable for this outer rim is a metal having a high degree of elasticity and tensile strength. I have found the particular metal most suitable to be vanadium steel, and open hearth steel has given good satisfaction. I have also found that in order that the rim shall stand up without fracture under long continued use, whether it is of the exact shape shown or of other suitable cross-section, it must consist of a single continuously integral piece or body of the metal and must be so rigid that it will be only very slightly flexed even under the most violent shocks to which the tire is ordinarily subjected in use. I find that if the rim is not of such a degree of rigidity the constant flexing of the rim in use apparently disturbs the molecular structure of the steel so that after a greater or less, but always comparatively small, mileage, there results crystallization followed by fracture. Apparently also such crystallization and fracture are induced by the vibration which seems to be always present during use in a rim which is made up of separate pieces or parts of metal bolted or otherwise secured together, regardless of how strong and tight the bolting may be. With my rigid rim, consisting of a single continuously integral annulus of steel provided with a suitable cushion tread as shown, although not necessarily of the relative thickness shown, the rim apparently retains its strength after long continued use under the hardest conditions. By way of example, a channel rim such as illustrated in Fig. 3 of the drawing, made from open hearth steel three-sixteenths inch thick and three inches wide and with side flanges one inch wide has been found entirely satisfactory for use in tires for an automobile of medium size weighing over 3000 pounds. Obviously, the dimensions of the rim might be varied, and should be varied according to the character of the metal and according to the size of the tire and the load to be carried.

The steel from which a rim is to be made may be rolled out directly to the required cross-section, or may be rolled flat and the edges of the strip then turned to form the side flanges. The strip for each rim is then rolled or otherwise shaped to the desired curve and the meeting ends are secured together by electrically butt-welding them, or otherwise suitably welding them so that the rim becomes essentially a continuously integral annulus. I consider it very desirable that in the completed rim all parts thereof shall be normally without strain or tension and especially that the flanges shall not be under strain, and in forming the rims, I therefore, when the ends are to be secured by electrical butt-welding, make the strip slightly longer than the circumference of the completed rim and curve it so that the ends slightly overlap, making the amount of overlapping substantially equal to, or a little greater than, the length which is taken up in the process of welding. If the amount of such overlapping is just equal to the amount taken up in the welding process, the completed rim will be normally without strain or tension in any of its parts.

In order that the peripheral or tread portion of the inflatable body shall always be pressed tightly into the channel of the rigid outer rim and against both the intermediate portion of the rim and its side flanges, and in order that it may follow the movement of the rim in the direction away from the wheel felly under ordinary shocks, the inflatable body should most desirably be of such size or so constructed that when under inflation without the metal rim being in place its circumference will be somewhat greater than the circumference of the inner face of the rim, and the distance between the side faces of its rim engaging ribs will be somewhat greater than the distance between the engaging faces of the rim flanges. The unsupported side walls of the body between the wheel felly and the rim extend outward radially of the wheel, or approximately parallel to the plane of the tire axis as shown, so that they shall act to hold the rim against lateral displacement relatively to the felly. It is desirable also that the sides of the inflatable body shall bulge or extend laterally but little or not at all beyond the sides of the rigid outer rim in order that they shall not be liable to undue wear or injury in case the tire is running in a rut or under similar circumstances. The outwardly turned edges of the flanges $c$ in Fig. 1 afford additional protection or will protect a body having somewhat more bulging sides than the straight flanges of Fig. 3.

With a construction such as shown, I find that it is not only not necessary, but is not desirable that the rigid outer rim be cemented or otherwise secured to the inflatable body, since relative circumferential movement between the outer rim and the inflatable body is, except for possible slight creeping, prevented by the friction due to the pressure of the body against the flanges and intermediate portion of the rim, and it is of advantage to have the rim free to move out from the body at the top of the wheel in the event of excessive shock being imparted to the tire at the bottom. The frictional resistance to circumferential movement between the outer rim and the inflatable body is increased by the wedging of the ribs of the body into the corner angles between the flanges and adjacent parts of the rim. The angular edge between the faces $f$ and $g$ of the body ribs should not be extended to such extent as to interfere with such wedging action. Any circumferential creeping or slip of the rim on the body which occurs apparently causes no substantial wear or injury to the body.

A tire constructed as herein described, on account of the large bearing surface of the rigid outer rim on the inflatable body, which equals the projected area of the rigid rim, requires a very much lower air pressure within the air-containing body to give the same supporting effort as is secured with a very much higher air pressure in the ordinary pneumatic tire with its flexible tread. For example, under conditions where a pressure of 80 to 90 pounds would be carried in an ordinary pneumatic tire, I secure the same support with a pressure of from 15 to 20 pounds, and even a relatively lower pressure may safely be used. A further advantage of my construction is that much less heat is developed through friction of the tire tread with the road, and that such as is developed appears to be almost entirely dissipated from the sides of the rigid outer steel rim. On this account, and because of the avoidance of wear on the flexible inflatable body, such body has a much greater life than a body of an ordinary pneumatic tire.

Because of the much lower air pressure required to be carried in my tire, the danger of blow-outs is greatly lessened, and in fact, substantially eliminated; and because of the greater supporting power under a given air pressure my tires may be used on much heavier trucks than it has heretofore been considered possible to equip with pneumatic tires. It should also be mentioned that the construction of my tire permits of retaining the standard circumferential sizes of the tires without alteration of the present form of wheels to which they are applied. It should also be noted that the rigid side flanges of the rigid metal rim in my construction, which extend inward about and support the sides of the flexible inflatable body, act to reduce or substantially prevent side roll of the tire in use, this effect of reducing or avoiding side roll being the greater as the side flanges of the rim are of greater depth and extend farther inward about the sides of the flexible body.

It is to be understood that the invention is not to be limited to the exact construction shown and to which the foregoing description has been largely confined, but that it includes changes and modifications thereof within the claims.

What is claimed is:

1. An armored pneumatic tire embodying the following elements, to-wit: a rigid puncture-resisting rim formed of a single continuously integral annulus having marginal inwardly extending approximately parallel flanges, and a flexible annular inflatable body having an internal pressure chamber extending radially outward between the side flanges and circumferentially extending projections at opposite sides of said chamber having approximately parallel side faces seating against the rim flanges and peripheral faces seating against portions of the rim adjacent the flanges, the relative proportions of the rim and body being such that internal pressure in the chamber tends to move the projections of the body laterally and radially into contact with the inner faces of the flanges and adjacent portions respectively of the rim, the rim being held against movement relatively to the body both radially and circumferentially only by frictional engagement of the opposing faces of the rim and body.

2. An armored pneumatic tire, comprising a flexible annular inflatable body, and a floating rigid armor rim mounted on the periphery of said body, said rim consisting of a continuously integral piece of metal formed with oppositely facing engaging faces extending longitudinally of the tire in planes approximately parallel to the plane of the axis of the tire, and the flexible body being formed with approximately parallel faces to bear against said engaging faces of the rim, whereby the rim is held against lateral displacement relatively to the body, unsupported side walls of the flexible body extending radially outward from the wheel felly to the rim, and the rim being supported and held against lateral displacement relatively to the wheel felly solely by the flexible body, and being free to move radially outward relatively to the flexible body under excessive shock.

3. An armored pneumatic tire, comprising a flexible annular inflatable body, and a floating rigid armor rim mounted on the periphery of said body, said rim consisting of a continuously integral piece of metal formed with integral inwardly extending approximately parallel side flanges and with its intermediate or main portion between the flanges transversely flat adjacent the flanges and having a central circumferentially extending outward bulge, and having a cushion tread on its peripheral face, and the flexible body being formed with shoulders to fit between and to bear outwardly against said side flanges, whereby the rim is held against lateral displacement relatively to the body, the unsupported side walls of the flexible body between the wheel felly and the rim being adapted to prevent lateral displacement of the rim relatively to the wheel felly, and the rim being supported and held against lateral displacement relatively to the wheel felly solely by the flexible body.

4. An armored pneumatic tire, comprising a flexible annular inflatable body, and a floating rigid armor rim mounted on the periphery of said body, said rim consisting of a continuously integral metal annulus formed with integral inwardly extending side flanges providing lateral bearing faces approximately parallel to the plane of the axis of the tire and with portions adjacent the flanges providing cylindrical bearing faces, and having a cushion tread secured to its peripheral face, and the flexible body being formed with circumferentially extending outwardly projecting portions forming shoulders to fit between and having approximately parallel side faces to bear laterally outward against said flanges and peripheral faces to bear radially outward against said cylindrical bearing faces of the rim, the unsupported side walls of the flexible body between the wheel felly and the rim being adapted to prevent lateral displacement of the rim relatively to the wheel felly, and the rim being supported and held against lateral displacement relatively to the wheel felly solely by the flexible body and being held against movement relatively to the body only by frictional engagement of the opposing faces of the rim and body.

5. An armored pneumatic tire, comprising a flexible annular inflatable body, and a floating rigid armor rim mounted on the periphery of said body, said rim consisting of a continuously integral metal annulus formed with integral inwardly extending side flanges approximately parallel to the plane of the axis of the tire and having a cushion tread secured to its peripheral face, and the flexible body being formed with circumferentially extending outwardly projecting portions forming shoulders to fit between and having approximately parallel faces to bear outwardly against said side flanges, whereby the rim is held against lateral displacement relatively to the body, the rim being supported and held against lateral displacement relatively to the wheel felly solely by the flexible body, and the side flanges of the rim extending inward about the body to support the same and leaving unsupported only comparatively narrow portions of the side walls of the body between the wheel felly and the rim flanges extending approximately parallel to the plane of the axis of the tire, whereby side roll of the tire is substantially prevented.

6. An armored pneumatic tire, comprising a flexible annular inflatable body, and a floating rigid armor rim mounted on the periphery of said body, said rim consisting of a metal annulus formed with inwardly extending side flanges approximately parallel to the plane of the axis of the tire, and the flexible body being formed with a layer of strain-resisting material extending from the inner portion thereof about the sides and tread portion thereof, such layer in the sides and tread portion of the body when the body is inflated being approximately semi-circular in cross-section, and the body having circumferentially extending outwardly projecting portions forming shoulders to fit between and having approximately parallel side faces to bear laterally against said side flanges and peripheral faces to bear radially outward against portions of the rim adjacent said flanges.

In testimony whereof I have hereunto set my hand in the presence of two subscribing witnesses.

BERNARD GRANVILLE.

Witnesses:
 A. L. KENT,
 PAUL H. FRANKE.